Aug. 28, 1945.  W. F. BERCK  2,383,702
PREDETERMINING COUNTER FOR FLUID METERS
Filed March 4, 1941  6 Sheets-Sheet 1

INVENTOR.
WILLIAM F. BERCK
BY
Oscar A. Mellin
ATTORNEY.

Aug. 28, 1945.    W. F. BERCK    2,383,702
PREDETERMINING COUNTER FOR FLUID METERS
Filed March 4, 1941    6 Sheets-Sheet 2

INVENTOR.
WILLIAM F. BERCK
BY
Oscar A. Mellin
ATTORNEY.

INVENTOR.
WILLIAM F. BERCK
BY
Oscar A. Mellin
ATTORNEY.

Aug. 28, 1945.  W. F. BERCK  2,383,702
PREDETERMINING COUNTER FOR FLUID METERS
Filed March 4, 1941  6 Sheets-Sheet 4

INVENTOR.
WILLIAM F. BERCK
BY
Oscar A. Mellin
ATTORNEY.

Aug. 28, 1945.  W. F. BERCK  2,383,702
PREDETERMINING COUNTER FOR FLUID METERS
Filed March 4, 1941   6 Sheets-Sheet 5

INVENTOR.
WILLIAM F. BERCK
BY
Oscar A. Mellin
ATTORNEY.

Aug. 28, 1945. W. F. BERCK 2,383,702
PREDETERMINING COUNTER FOR FLUID METERS
Filed March 4, 1941 6 Sheets-Sheet 6
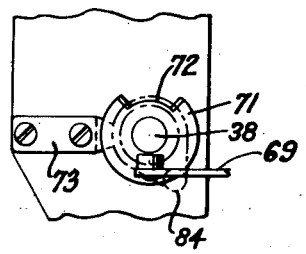
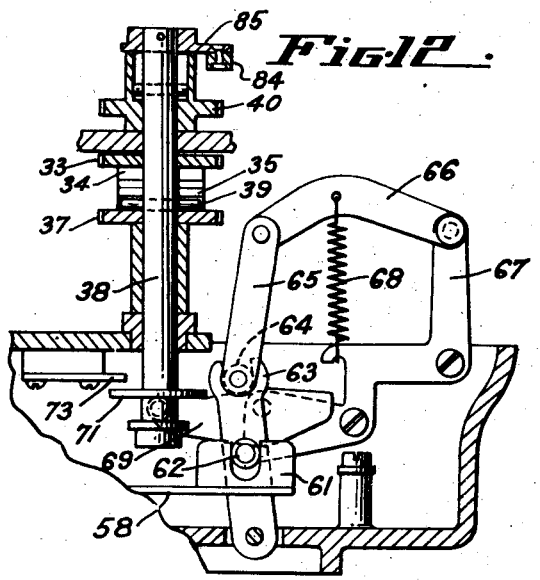
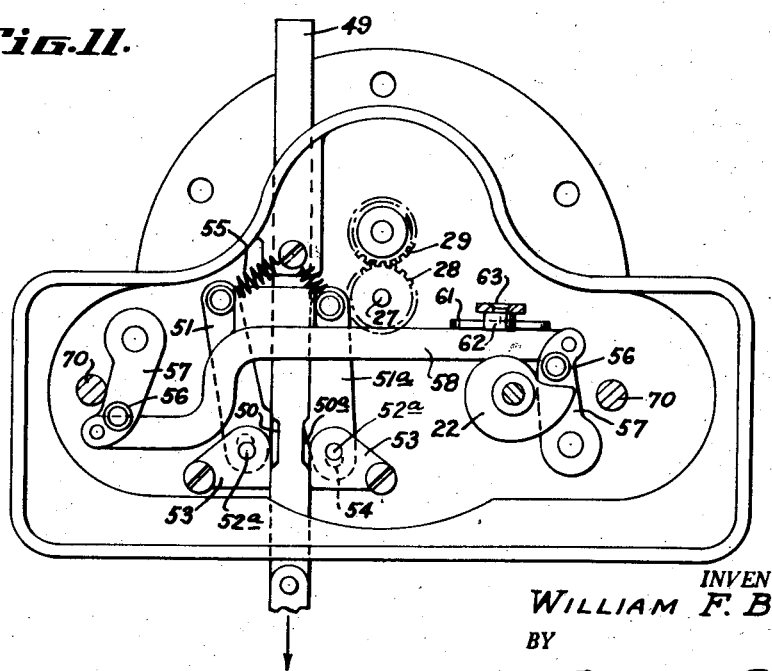
INVENTOR.
WILLIAM F. BERCK
BY
Oscar A. Mellin
ATTORNEY.

Patented Aug. 28, 1945

2,383,702

UNITED STATES PATENT OFFICE 2,383,702

PREDETERMINING COUNTER FOR FLUID METERS

William F. Berck, Hayward, Calif., assignor to Ralph N. Brodie Company, Oakland, Calif., a corporation of California Application March 4, 1941, Serial No. 381,644

5 Claims. (Cl. 235—132)

This invention relates to counting apparatus for use in connection with fluid meters of the type generally known as packaging or predetermining counters which are capable of being set to predetermine the quantity of fluid to be delivered from the meter on a subsequent operation thereof by automatically stopping the meter operation when said quantity has been delivered by the meter.

It is the principal object of my present invention to provide an improved packaging or predetermining counter of the character referred to by means of which any number of meter deliveries, each of a predetermined quantity, may be made after one setting of the counter without resetting the same, either manually or automatically, but by simply manually reopening the meter shut-off valve after each delivery, which counter will, during operation of the meter, also display the portion of the predetermined quantity already delivered and that portion remaining to be delivered.

In practicing my invention, the shut-off valve of the meter is provided with a latch bar with which is associated a latch mechanism for maintaining the valve in open position. Associated mechanism I provide two counter mechanisms, for rendering it ineffective. To operate the trip mechanism I provide two counter mechanisms, either one of which can be preset to the quantity desired. These counter mechanisms are so associated that they operate in opposite directions at the same speeds and in the same amounts. The trip mechanism is operated first by one and then the other of said counters in alternate fashion through the means of trip operating mechanisms fitted one to each counter. These counters are driven from the meter through the medium of a clutch shaft. The operation of the clutch shaft is reversed at the end of each operation by a clutch shifting mechanism which is conditioned to effect such reversal at the end of each tripping operation. Also, the trip mechanism and the trip operating mechanisms are conditioned during each tripping operation to effect the operation of the trip mechanism alternately by said counter mechanisms. That is to say, after one counter mechanism has been preset and the desired quantity has been delivered through the meter, when that counter reaches tripping position, the second counter has been driven to a preset position the same as the original setting of the first counter. At the same time the trip operating mechanism of the first counter has caused, through the medium of the trip mechanism a release of the latch mechanism to effect closing of the shut-off valve. At the same time the various mechanisms are conditioned so that the second counter will be driven on the subsequent operation in a reverse direction and the trip operating mechanism thereof and the tripping mechanism has been conditioned for operation thereby during the succeeding operation.

One form which the invention may assume is exemplified in the following description and illustrated by way of example in the following drawings, in which:

Figs. 8, 9, 10 and 11 are plan views of the tripping and latching mechanisms with parts in section and other parts removed in order to more clearly disclose the construction and mode of operation of the tripping and latching mechanisms, the figures showing these mechanisms in the various positions which they assume during the operation of the apparatus.

Fig. 12 is a fragmentary view in section somewhat similar to Fig. 7 but disclosing the shifting mechanism in a second position.

Fig. 13 is a fragmentary view in plan of the mechanism which prevents shifting of the clutch shaft except at full cycle position.

Figure 1:
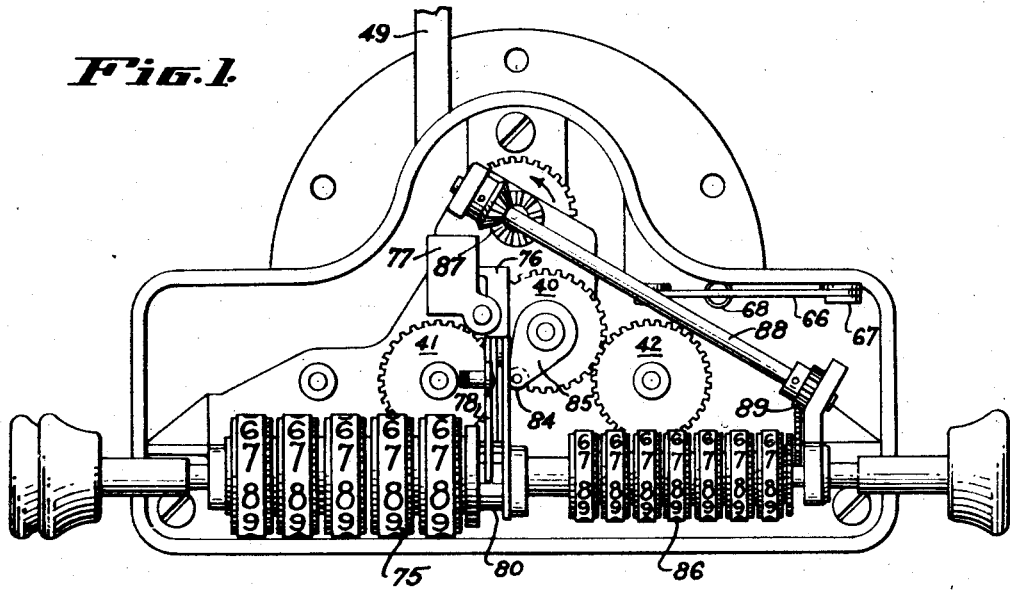
Fig. 1 is a plan view of a predetermining counter embodying the preferred form of my invention with the cover removed.
Figure 2:
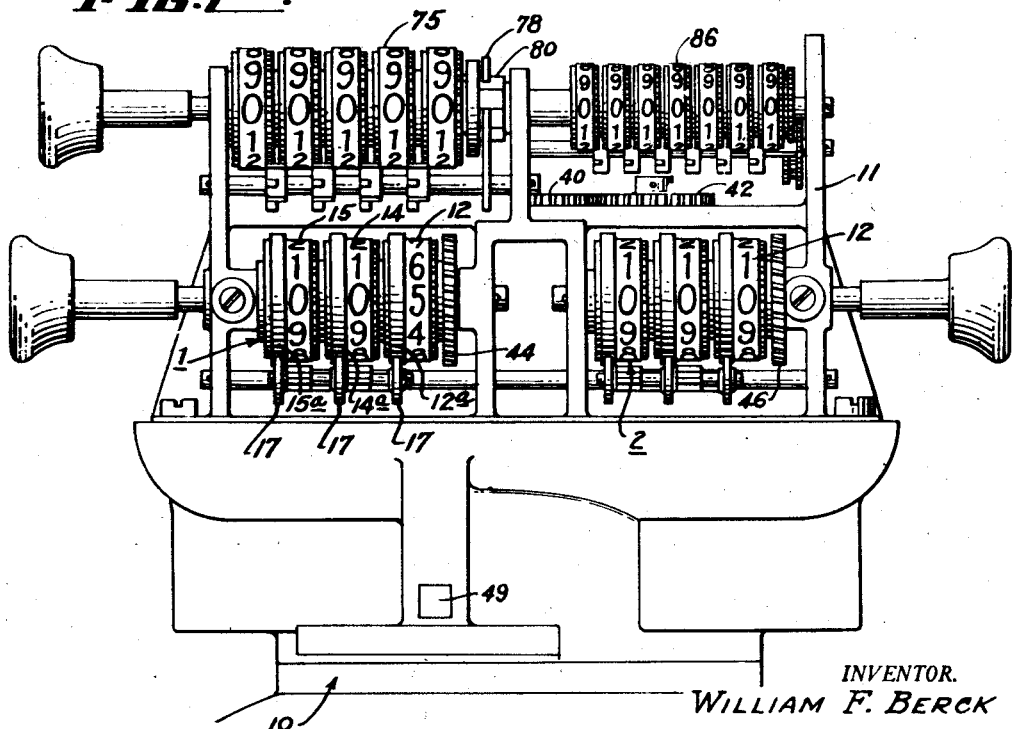
Fig. 2 is a front elevation of the apparatus disclosed in Fig. 1 with the cover removed.

In the drawings 10 indicates a fluid meter upon which a counter mechanism frame 11 is mounted. The counter frame 11 carries the apparatus with which this application is particularly concerned. This apparatus is a predetermining mechanism for releasing a shut-off valve latch bar after a predetermined amount of meter operation. The mechanism is capable of being preset so that the meter operation will automatically cease after a predetermined volume of fluid has passed therethrough by the medium of releasing a latch bar and closing a valve controlling the meter port.

Mounted on the counter frame 11 are two sets 1 and 2 of predetermining counters, each counter comprising three counter wheels, a units counter wheel 12, a tens counter wheel 14 and a hundreds counter wheel 15 which are connected together by a transfer mechanism such as shown in my United States Letters Patent No. 2,082,375, dated June 1, 1937.

The counters of each predetermining counter 1 or 2 may be independently set for predetermining the amount of fluid to be discharged through the meter before the shut-off valve is closed in a manner such as illustrated and described in my aforesaid Letters Patent of the United States. That is to say, the counter wheels of the predetermining counter 1 may be set to any desired quantity, or the counter wheels of predetermining counter 2 may be set independently. However, there is an operative connection between these two counters which will be hereinafter described, by means of which the two predetermining counters 1 and 2 are driven in synchronism and in opposite directions. That is to say, assuming that the predetermining counter 1 is set to indicate some selected or desired quantity, for example "50," and the other predetermining counter 2 is set to zero, upon operation of the meter, the wheels of the predetermining counter 1 will retrograde toward zero, while the counter wheels of the other set 2 will advance from zero at the same rate, so that when all of the counter wheels of counter set 1 reach zero, the wheels of counter set 2 will indicate "50,". Therefore, the counter set which is in operation to control the shut-off valve will indicate the quantity still to be dispensed before closing of the valve, while the other counter will indicate the amount which has been dispensed.

The tripping mechanism which is associated with the counters is such that when the counter which has been preset to indicate the desired quantity has reached zero position and the valve is closed, the tripping mechanism is conditioned for the subsequent operation by the other counter which at that time will have been preset to indicate the same amount as was originally indicated by the setting of the first counter. The second predetermining counter then controls the tripping mechanism and as it is operated and retrogrades toward zero, the other counter will be synchronously reset as has just been described. The manner in which the two counters are synchronously driven will be described in detail hereinafter.

Figure 5:
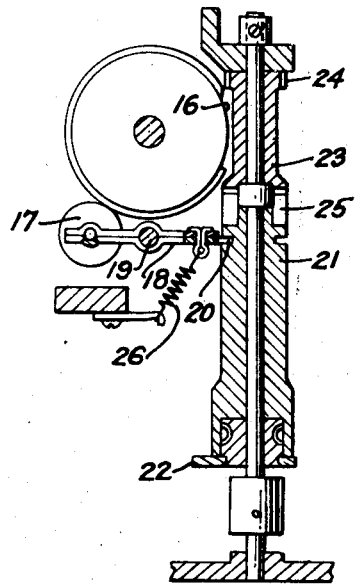
Fig. 5 is a fragmentary view in vertical section showing one of the tripping cams and the manner in which it is positioned with its associated predetermining counter.

It will be noticed from the drawings that the counter wheels 12, 14 and 15 of each set are each provided with a fixed trip wheel 12a, 14a and 15a. Each trip wheel is formed with a recess in its periphery, as illustrated in Fig. 5, at 16. When either predetermining counter is in tripping position, the tens and hundreds wheels will be in the zero position and the units wheel will be in the 1 position; that is 1 station from zero position. At this time all of the recesses 16 of all three wheels will be in alignment and in register with rollers 17 rotatably mounted in alignment on the free end of a wide fulcrum lever 18 pivoted intermediate its ends as at 19 to the counter frame 11. The other free end of this fulcrum lever 18 is provided with a bifurcated portion collared as at 20 to a cam driving sleeve 21 carrying a tripping cam 22. The sleeve 21 is made in two parts, one portion being the portion which carries the cam 22, while the other portion is indicated by the numeral 23 which is fitted with a pinion 24 by means of which a drive is transmitted continuously to the sleeve 21 to continuously drive the tripping cam 22. The two parts of the sleeve are connected together by a slip key joint 25 which permits the cam carrying portion of the sleeve 21 to be moved axially with respect to the portion 23 but maintain the two fixed together with respect to rotation.

When the cam 22 is in elevated position, as illustrated in Fig. 5, which is when the recesses 16 of the counter wheels, or any of them, of the predetermining counter are in other than zero position, it is in effect in inoperative position. When the tens and hundreds wheels are in the zero position and the units wheel is in the 1 station, all of the recesses 16 align and register with the rollers 17 so that the roller end of the fulcrum lever will be free to move upwardly into the recesses 16 and enable a spring 26 to move the bifurcated end 20 of the lever 18 downwardly, imparting downward movement to the cam sleeve 21, which will condition the trip mechanism for tripping the shut-off valve when the units wheel advances from the first station to the zero position.

The predetermining counter sets 1 and 2 are identical in construction and operation, and the description of the construction and operation just concluded refers to each. In Figs. 7 to 11, inclusive, I have indicated the cam of the predetermining counter set 1 by the numeral 22a for the purpose of description.

Figure 3:
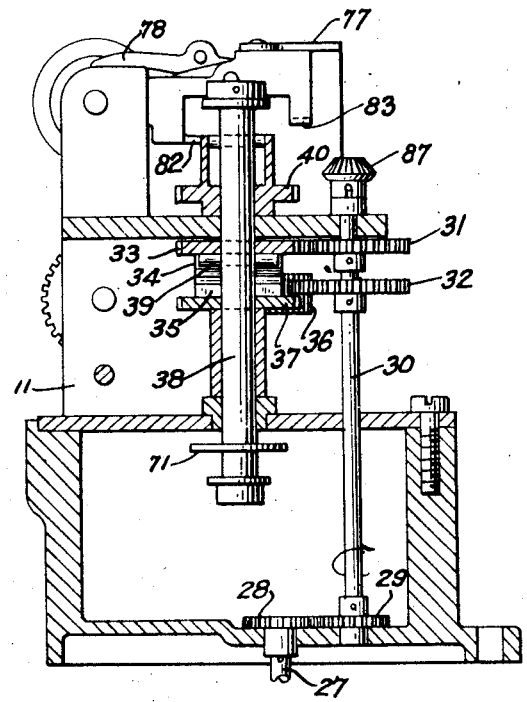
Fig. 3 is a vertical transverse sectional view through the apparatus taken along the center line of the clutch shaft.
Figure 4:
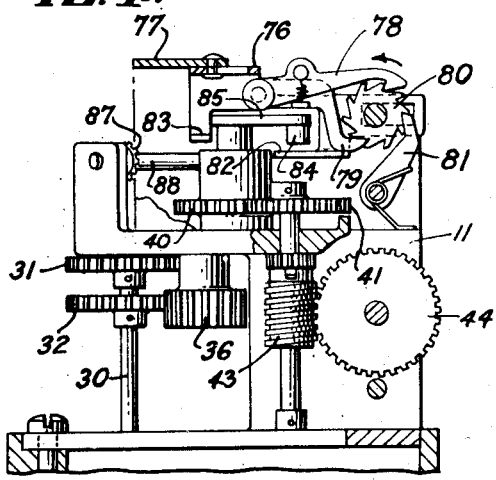
Fig. 4 is a view in end elevation and in section showing the mechanism for operating the counter for totaling the number of tripping operations.

As previously mentioned, the meter is the medium which drives or operates the predetermining counter sets 1 and 2 and they are at all times driven in opposite directions. The driving mechanism is most clearly illustrated in Figs. 3, 4, 6 and 7. The drive is effected as follows: Referring to Fig. 3, the meter drive shaft is indicated by the numeral 27 which is fitted with a spur gear 28 in constant mesh with the gear 29 fixed on a counter drive shaft 30 so that when the meter is in operation, the counter drive shaft 30 will be revolved in the direction of the arrow in Fig. 3. Adjacent its upper end the counter drive shaft has fixed thereon two driving spur gears 31 and 32. The spur gear 31 is in constant mesh with a spur gear 33 fixed on the upper clutch part 34, which is one of two clutch parts 34 and 35. The other spur gear 32 is in constant mesh with an idler gear 36 which is in mesh with a spur gear 37 fixed on the lower clutch part 35.

The two clutch parts 34 and 35 are collared against axial movement in the counter frame and are mounted on a clutch shaft 38 rotatably journaled in the counter frame. The clutch shaft 38 is capable of axial shifting movement so that it may be clutched either to the clutch part 34 or clutch part 35, depending upon its vertical position. For this reason the clutch shaft is fitted with a fixed clutch pin 39 which, when the clutch shaft 38 is in its upper position, is in clutching engagement with the clutch part 34, and when the clutch shaft 38 is in its lower position, the clutch pin 39 will be in clutching engagement with the lower clutch part 35. Obviously, when the clutch pin 39 clutches the clutch part 34 to the clutch shaft 38, the clutch shaft will be driven in a clockwise direction, but when the pin 39 clutches the clutch shaft 38 to the clutch part 35, the clutch shaft will be driven in a counterclockwise direction.

Splined on the clutch shaft 38 is a main counter drive gear 40 which is alternately driven by the clutch shaft in opposite directions. That is, when the clutch shaft is driven by the upper clutch part 34, the main counter drive gear 40 will be driven in a clockwise direction, and when the clutch shaft is driven by the lower clutch part 35, the counter drive gear 40 will be driven in a counter clockwise direction. As the main counter drive gear 40 drives both of the predetermining counter sets, it is obvious that they will at all times be driven in opposite directions. However, they both reverse their direction of operation at the end of each complete tripping cycle of operation. That is to say, assuming that counter 1 is being operated by the meter and the counter wheels thereof are retrograded toward zero, the predetermining counter 2 will be driven in the opposite direction with its numerals advancing from zero toward 9. At the end of the operation, when the wheels of the predetermining counter set 1 reach zero and the valve is released, shifting of the clutch shaft 38 is automatically effected, as will be hereinafter described, so that the driving gear 40 will, upon recommencement of meter operation, be driven in the opposite direction so that the wheels of counter set 2 will retrograde toward zero while the wheels of predetermining counter set 1 will advance from zero toward 9.

Figure 6:
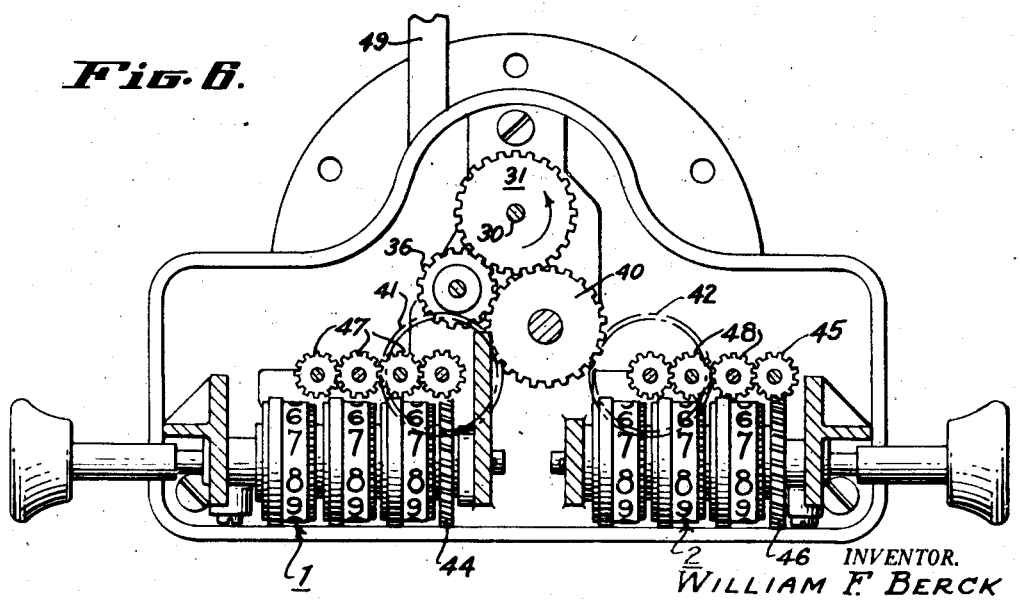
Fig. 6 is a view similar to Fig. 1 with the exception that it is partly in section to disclose the drive mechanism associated with the two sets of predetermining counters.
Figure 7:
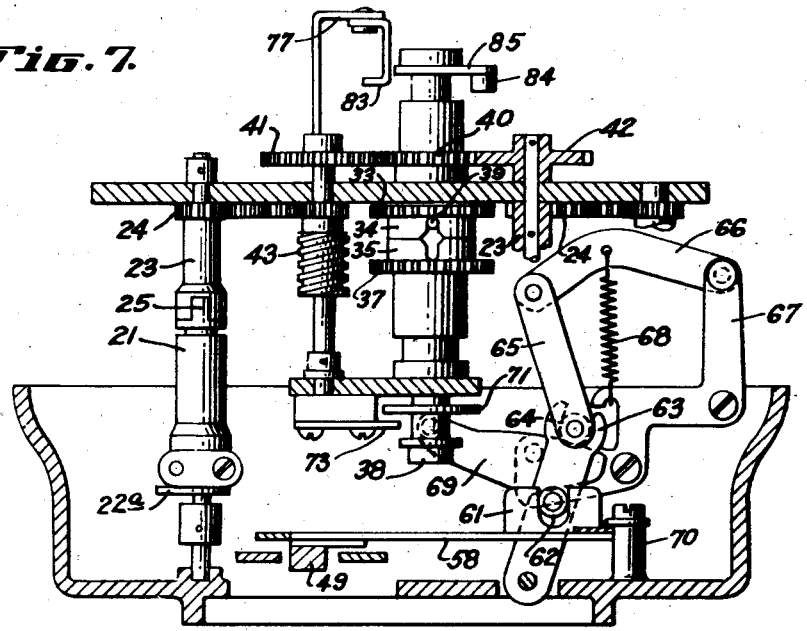
Fig. 7 is a fragmentary view in transverse section disclosing the mechanism for conditioning the clutching apparatus for reversing the direction of rotation of the clutch shaft at the end of each tripping operation.

The driving connection between the main counter drive gear 40 and the two predetermining counter sets is most clearly illustrated in Figs. 6 and 7, where it will be seen that the main counter drive gear 40 is in mesh with two spur gears 41 and 42, the gear 41 driving a worm 43 in mesh with a worm drive gear 44 of the counter set 1, while the gear 42 is driving a similar worm 45 in mesh with a worm drive gear 46 of the counter set 2. A train of spur pinions 47 of equal diameter is driven by the gear 41 to drive the cam sleeve shaft 21 of the predetermining counter set 1 through the medium of the cam sleeve shaft pinion 24. In the case of the predetermining counter set 2, the gear 42 drives the pinion 24 of its cam shaft sleeve 21 directly, and through this pinion and a train of spur pinions 48 drives the worm 45 which is in mesh with the drive worm gear 46 of the predetermining counter set 2. Of course, in assembling the device, the cams 22 and 22a of the two predetermining counters are relatively set in proper relative positions.

The trip mechanism which is associated with the two predetermining counters is most clearly illustrated in Figs. 7 to 12, inclusive. Referring to these figures, it will be seen that extending horizontally through the counter frame and guided therein for reciprocation is a valve latch bar 49 which is connected to any preferred standard type of shut-off valve which is urged to close by spring or fluid pressure, or by both, so that when the valve is open, there is a constant pressure or force exerted on the latch bar 49 to move the same endwise in the valve closing direction. In my present apparatus it is, of course, contemplated to latch this bar in open position, holding the valve open, and that when the tripping position of the mechanism is reached, the bar 49 be unlatched to enable the valve to close. At the start of each operation the latch bar 49 is moved to valve open position manually in any preferred manner.

For the purpose of latching the valve in open position, the latch bar 49 is formed with opposed keeper notches 50 and 50a adapted to be engaged by latch dogs 51 and 51a which are arranged one on each side of the bar for pivotal movement in a horizontal plane for cooperation with the respective notches 50 and 50a. The latch dogs 51 and 51a are pivoted on pins 52 and 52a carried in fixed brackets 53 on the frame. The holes in the dogs 51 and 51a, however, which engage the pins 52 and 52a are slotted somewhat, as illustrated, for the purpose of giving the latch dogs 51 and 51a a limited amount of endwise movement for a purpose which will be hereinafter described. The slotted openings in the latch dogs 51 and 51a are indicated by the numeral 54.

Figure 8:
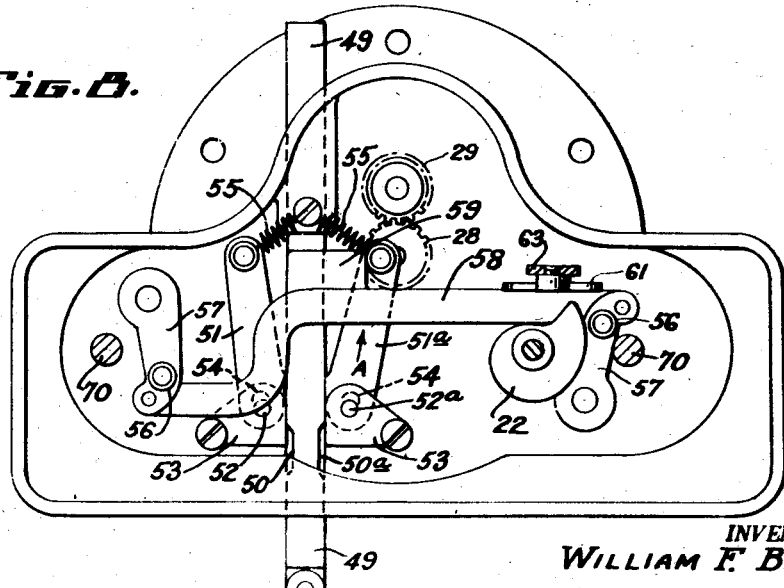

It should be pointed out here, however, that the free ends of the latch dogs 51 and 51a are connected by tension springs 55 to the frame in a manner which urges the latch dogs in a direction indicated by the arrow A in Fig. 8, so that when the latch dogs are not engaged with the keeper notches 50 and 50a, the pins 52 and 52a will be in the outermost ends of the slotted openings 54, but when the keeper dogs are engaged with the notches 50 and 50a, the force exerted by the latch rod 49 will cause the pins 52 and 52a to be in the innermost ends of the slots 54. The purpose of this will be made apparent hereinafter.

The springs 55 also tend to move the free ends of the latch dogs 51 and 51a in a direction tending to engage them with the keeper notches 50 and 50a so that when these notches are in proper alignment with the latch dogs, engagement therebetween will be effected.

Figure 9:
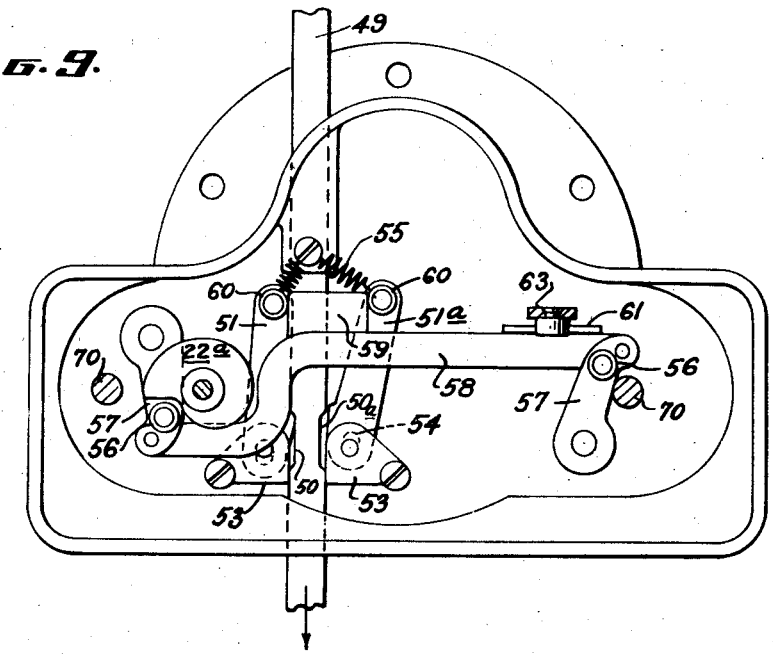

Assuming that the predetermining counter set 1 has been set so as to predetermine a desired quantity of liquid to be discharged by the meter through the shut-off valve and the valve has been moved to open position, the trip mechanism parts will assume the position substantially that in Fig. 9.

It is desired to point out, as previously stated, that the recess of the units wheel of each set is circumferentially differently positioned with respect to the numerals on its wheel than are the recesses on the tens and hundreds wheels of each set. This is so that all of the recesses of each set will align when the tens and hundreds wheels of each set are in zero position, while the units wheel of that set will be in the 1 station from zero position. Thus, the tripping mechanism is conditioned for operation when the units wheel of the set at the time controlling the tripping is approximately one gallon from the point where it is desired to shut off the meter. The reason for this is that extreme accuracy is desired and consequently the actual tripping of the latch bar 49 is accomplished by the cam 22 or 22a associated with the particular counter set which is in operation to control the tripping at the time. This is accomplished by the cam moving its associated latch dog 51 or 51a to unlatching position when a definite point on the cam registers with the cam roller 56 on the cam arm 57 associated with the cam which is in operation.

Of course, as previously set forth, there is one of these cams 22 or 22a for each counter set and they are spaced apart as illustrated in the drawings. Likewise, there is a cam arm 57 associated with each cam, these cam arms being pivoted to the frame at opposite sides of a center line drawn between the centers of the two cams. The free ends of the cam arms 57, which, incidentally, carry the cam rollers 56, are connected together by a connecting bar 58 so that they will move in absolute unison. This connecting bar 58 carries a fixed cam block 59 which is interposed between the cam rollers 60 at the free ends of the latch dogs 51 and 51a so that when the connecting bar is moved by swinging movement of one of the cam arms 57, it will engage the proper cam roller 60 at the ends of one of the latch dogs and swing the same to a position where its latching end disengages from its associated latch recess 50 or 50a in the latch bar 49.

To illustrate this operation, assuming that the predetermining counter 1 is in operation to predetermine the amount of liquid to pass through the meter, the tripping mechanism will be substantially in the position shown in Fig. 9. In this position the latch dog 51 has its latching end engaged with the latch recess or notch 50 in the latch bar 49, while the cam block 59 has engaged the cam roller 60 on the latching dog 51a and swung it to a position where its latching end cannot engage its associated latch notch 50a. Likewise, due to the slight amount of endwise movement permitted the latch dog 51a by the slotted opening 54, it has been moved endwise by its associated spring 55 to a position where its latching end is out of register with the notch 50a so that if it is released by the cam block 59, it still cannot engage that notch.

Assuming further now that the recesses 16 of the wheels in predetermining counter 1 have reached the position where the tens and hundreds wheels are at zero and the units wheel is at 1 station, the rollers 17 of the associated fulcrum lever 18 move into the recesses 16 of the trip wheels and the associated cam 22a is lowered into alignment with the cam roller 56 and therefore the predetermined volume of liquid to pass through the meter is substantially one gallon short of the exact amount. However, at this time the proper high point on the cam 22a is not in register with the cam roller 56 so that no tripping will be effected, but as the units wheel moves toward zero, the cam 22a will be driven therewith, and when the exact amount of fluid has passed through the meter and the units wheel reaches zero, the proper high point on the cam 22a will have registered with the cam roller 56 and will move the latch dog 51 out of latching engagement with the latch bar 49 and the shut-off valve will be permitted to close.

The operation which occurs during the movement of the cam 22a from its angular position when it is lowered to its angular position when the high point thereof registers with the cam roller 56 is as follows: As the cam arm 57 is swung about its pivotal point, it imparts endwise movement to the connecting bar 58 to which is fixed the cam block 59. This cam block 59 then commences to move the latch dog 51 about its pivotal point in a direction disengaging its latching end from its associated notch 50. Naturally, at the same time it tends to release the latch dog 51a for movement, but due to the fact that this latch dog has been moved endwise to an extent placing its latching end out of register with the notch 50a, the former cannot engage the notch. This movement of the cam arm 57 and the connecting bar 58 continues until the high point of the cam 22a is reached, at which time the latching end of the latch dog 51 is disengaged from the notch 50 of the latching bar 49, releasing the latter to enable the force exerted on the valve to close the same.

However, a second operation takes place during the movement of the cam 22a from its angular position when it is lowered into register with the cam roller and the high point thereof when the full tripping is effected. This operation is a shifting of the meter drive from predetermining counter 1 to predetermining counter 2 so that on a subsequent operation of the meter, predetermining counter 2 will control the operation of the trip mechanism.

Referring to the drawings, particularly Figs. 7 and 8, it will be seen that the connecting bar 58 carries a jaw 61 which engages a roller 62 carried on a shifting fork 63. The upper end of this fork is bifurcated and engages a roller 64 carried on a link 65 depending from a spring lever 66 pivoted at one end to a bracket 67 rigidly secured to the frame. A spring 68 is connected to this bracket and to the spring lever 66 tending constantly to move the same downwardly and to depress the link 65.

Figure 10:
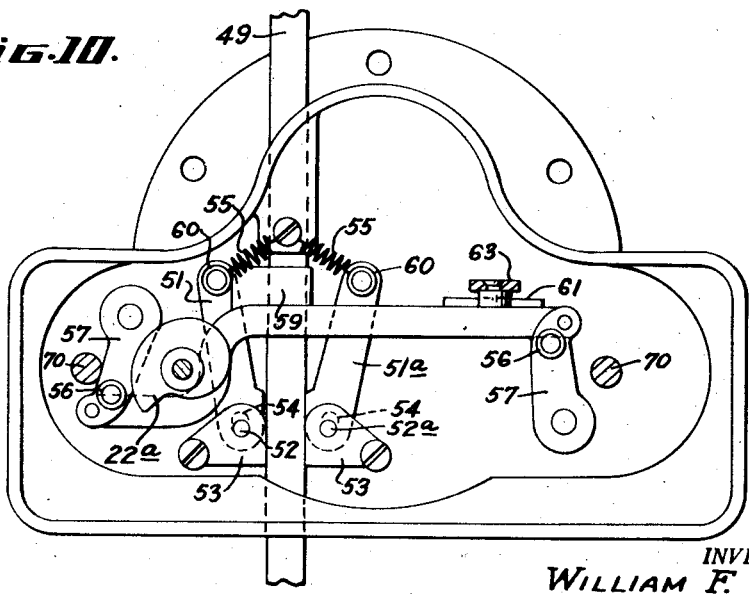

Associated with this mechanism is a shifting lever 69 which is substantially centrally pivoted to the bracket as illustrated. One end of this lever is connected with the clutch shaft 38 in a manner to enable it, when it is swung about its pivotal point, to shift this shaft axially. When the predetermining counter 1 is in operation, the shifting fork 63 has been moved by operation of the connecting bar 58 to the position shown in Fig. 7, where the roller 64 on the link 65 has engaged the cam-like surface of the shifting lever 69 at one side of its pivotal point and moved the same about its pivotal point to an extent where the clutch shaft 38 is in its uppermost position. However, when the connecting bar 58 moves endwise to release the latch dog 51, it moves the shifting fork 63 simultaneously. When the connecting bar 58 reaches the end of its movement, the roller 64 on the link 65 has been shifted by the shifting fork 63 to a position on the opposite side of the pivotal center of the shift lever 69 and therefore conditioned to exert spring pressure on the shift lever 69 in a direction tending to shift the clutch shaft 38 to its lower position. It is obvious from the drawings that the shifting mechanism just described, that is, the shifting fork 63 and the link 65, has a snap over center toggle action and it is so designed that when it snaps over center, due to the spring force exerted against the spring lever 66, it travels a distance which moves the connecting bar 58 endwise a distance beyond that which the cam rise normally moves it. The end of the stroke of the connecting bar 58 is determined by stop pins 70 associated with each cam arm as illustrated in Figs. 8 and 10. This position is such that the cam arm 57 associated with the cam, which is to be put in operation on a subsequent cycle, will be properly positioned for cooperation with that cam when it is lowered for operation. Consequently, as soon as the clutch parts 34 and 35 properly register, the gear 37 will be clutched to the clutch shaft 38, reversing the drive of the same. When in the latter position, the mechanism assumes the position shown in Fig. 12.

It will be seen that at this point the latch dog 51a is free to move in a direction engaging its latching end with the notch 50a so that upon manual shifting of the latch bar 49 to a position opening the shut-off valve, the latching end of the latching dog 51a will engage with the notch 50a. Upon manual release of the latch bar 49 it will move slightly in the closing direction due to the slot 54 allowing a slight endwise movement of the latch dog 51a. However, the latch dog 51 will be held from latching engagement with the notch 50 and will, upon the slight endwise movement of the dog 51a, be positioned with its latching end out of register with the notch 50, so that when it is subsequently released by the cam block 59, it will be unable to engage that notch.

The meter, of course, will then be in operation and when the recesses in the trip wheels of predetermining counter 2 register or align, the cam 22 associated with the predetermining counter 2 will lower into a position registering with the cam roller 56 on the associated cam arm 57. As this cam 22 advances toward its high point, the cam arm 57 will be swung outwardly, shifting the connecting bar 58 endwise, which will be accompanied by movement of the cam block 59 and swinging movement of the latch dog 51a to unlatching position, as previously described in connection with the previous operation.

When the movement is fully effected, the latch end of the latch dog 51a will, of course, be disengaged from the notch 50a and the latching bar 49 will be released to permit closing of the shutoff valve. As is true in connection with the previous cycle of operation, the connecting bar 58 will have caused shifting of the shifting fork 63 and conditioning of the shifting mechanism to bear on the opposite side of the pivotal point of the shifting lever 69 and condition the latter to shift the drive from predetermining counter 2 to predetermining counter 1.

With respect to shifting of the clutch shaft 38 so as to reverse its drive at the end of each operation of either of the predetermining counters 1 and 2, I desire to point out here that such shifting can only be effected at full cycle position. Obviously the clutch slots in the clutch parts 34 and 35 will align at every ninety degrees, due to the fact that the clutch parts are driven in opposite directions, and it is to prevent shifting at any time, except full cycle position, that I provide the mechanism which is shown in Fig. 13. This mechanism includes the disc 71 on the clutch shaft 38 which has a segmental recess 72 formed in its periphery. A fixed stop member 73 prevents shifting of the clutch shaft 38 from its upper to its lower position, or from its lower to its upper position, at all times except when the segmental notch 72 in the disc 71 registers with the stop member 73. At all other times the disc 71 would engage, on an attempt to shift the shaft, either the upper or underside of this stop member 73 and prevent shifting of the clutch shaft 38.

Included within my present mechanism is a packaging counter 75 which is adapted to indicate the combined number of operations of the predetermining counters 1 and 2. The counter wheels of this counter can also be reset manually to zero in the same manner as re-setting of the counter wheels of the predetermining counters are reset. It is intended that the numerals on the packaging counter 75 indicate each completed tripping cycle of operation of the predetermining counters 1 and 2 so that it can be told how many packages of the predetermined quantity have been delivered. Therefore, it is essential that the units wheel of the packaging counter 75 be advanced one digit during each complete tripping cycle of operation of either of the predetermining counters 1 and 2. The manner in which this is effected is as follows:

Referring particularly to Figs. 1, 3, 4 and 7, it will be seen that a reciprocable slide member 76 is reciprocably attached to a bracket 77 fixed to the counter frame in a manner allowing a predetermined amount of reciprocable movement to the slide 76. This slide carries two pivotal pawls 78 and 79, both of which engage a ratchet wheel 80 connected with the units wheel of the counter 75. The pawl 78 is adapted to turn the ratchet wheel a predetermined amount, which is exactly one-tenth of a revolution, on one stroke of the slide 76, while the pawl 79 is adapted to turn the ratchet wheel 80 a similar amount on the opposite stroke of the slide 76. A spring-pressed pawl 81 is provided to prevent the ratchet wheel 80 from retrograding.

To operate the slide, it is provided with two tangs 82 and 83 which are adapted to be alternately engaged by a roller 84 at the end of a crank arm 85 fixed to the top of the clutch shaft 38. When the clutch shaft is in its lower position, the roller 84 engages the tang 82 to move the slide 76 through one stroke of its cycle, and when the clutch shaft is in the upper position, the roller 84 will engage the other tang 83 to move the slide 76 through the other stroke of its cycle. Consequently, each time the predetermining counter 1 operates through its tripping cycle, the slide is removed in one direction, and each time the predetermining counter 2 operates through its tripping cycle, the slide is moved in the opposite direction, each stroke being recorded by the packaging counter 75 as a unit. Therefore, assuming that the desired quantity to be delivered is fifty gallons and a number of packages are to be filled at this quantity, the operator by merely looking at the packaging counter 75 can tell how many packages of that quantity have been delivered.

I also include in my counter mechanism a totalizing counter 86 which indicates the grand total of fluid passing through the meter in gallons. This totalizing counter 86 is of a conventional type driven from the counter drive shaft 30 through the medium of bevel gears 87, a shaft 88 and a gear drive 89.

In operation of the device, it is constructed and assembled as illustrated in the drawings and mounted on a meter so as to establish a drive between the meter drive shaft 27 and the counter drive shaft 30, as previously described. The wheels of the predetermining counters 1 and 2 are set to zero so that all of the mechanism will be in full cycle position. Assuming then that the clutch parts and trip mechanism are in the condition illustrated in Figs. 7 and 8, the operator will set the wheels of predetermining counter 1 to the quantity which he desires for each package. The operator then opens the valve which shifts the latch bar 49 to the position illustrated in Fig. 9. The instant that the valve is opened, the meter causes driving of the counter drive shaft 30 and imparts a drive to the clutch shaft 38 in turn driving the drive gear 40, which in turn imparts a drive to the worm gears 44 and 46 through the worms 43 and 45, as previously described, driving the two predetermined counters 1 and 2 in opposite directions. The direction in which the predetermining counter 1 will be driven, however, will be that causing the counter wheels thereof to drive in a direction from nine toward zero, while the counter wheels of the predetermining counter 2 will be driven in the direction from zero toward 9, so that the predetermined counter 1 is subtracting, while the predetermining counter 2 will be adding exactly in synchronism.

When the tens and hundreds wheels of the predetermining counter 1 reach zero and the units wheel reaches the one station, the notches 16 in the periphery of their trip wheels will be aligned to allow the rollers 17 to move radially inward with respect to the trip wheels, swinging the lever 18 about its pivotal point and lowering the cam shaft sleeve 21, placing the cam 22a into register with the roller 56 on the cam arm 57. As the cam commences to reach its high point, the cam arm 57 will be swung outwardly, moving the connecting bar 58 and consequently the block cam 59. This, as previously described, causes swinging movement of the lever 51 in a direction disengaging its latching end from the notch 50 in the latch bar 49 exactly at the time when the units wheel reaches the zero position. At the moment of disengagement the spring or fluid pressure on the valve causes it to close, naturally shifting the latch bar 49 to a position placing the notches 50 and 50a out of register with the latch ends of the tripping dogs 51 and 51a.

During this operation, as previously described, the shifting fork 63 will have passed over the pivotal center of the shift lever 69, which snap over action will swing the cam arm 57 to its maximum position against the stop pin 70 and at the same time conditioning the shift mechanism for shifting the clutch shaft 38 downwardly when the segmental notch 72 registers with the stop member 73. At this point of registry the clutch shaft will shift downwardly disengaging its clutch pin 39 from the clutch part 34 and engaging it with the clutch part 35.

At this point it is obvious that as soon as all of the counter wheels of the predetermining counter 1 have reached zero position, the counter wheels of the predetermining counter 2 will have been advanced to preset condition identical with that at which counter 1 was preset at the commencement of the operation. Also, the driving mechanism, by the shifting of the clutch shaft 38, will have been conditioned so that upon a subsequent opening of the valve and operation of the mechanism, the clutch shaft 38 will be driven in the opposite direction, which, through the driving gear 40, will drive the worms 43 and 45 in opposite directions, and thereby reverse the direction of driving of the two predetermining counters 1 and 2. Also the tripping mechanism will be conditioned so that counter 2 will, on subsequent operation, control the tripping of the latch bar 49 in that the latch dog 51a will be conditioned so that upon subsequent opening of the valve its latching end will engage with the notch 50a to maintain the same in position, holding the valve open during the succeeding operation.

As soon as the valve is opened and the latch bar 49 is in a position with its notch 50a engaging the latching end of the latching dog 51a, the meter will commence operating and will commence driving the wheels of the predetermining counter 2 from their preset positions toward zero. Also, this drive will advance the counter wheels of the predetermining counter 1 from zero toward nine in synchronism therewith.

When the tens and hundreds wheels of counter 2 are in zero position and the units wheel thereof is in the one station, the notches 16 of the trip wheels 12a of the counter wheels of the predetermining counter 2 will align and the rollers 17 associated therewith will drop into the recesses 16, moving the lever 18 about its pivotal point and lowering the cam sleeve 21 carrying the cam 22 to operative position relative to its cam roller 56 on the associated cam arm 57. As this cam moves toward its tripping position or its high point, the cam arm 57 will be swung outwardly, causing the block cam 59 to disengage the latching end of the latching dog 51a from the notch 50a at the instant that the units wheel of counter 2 reaches zero position, allowing the latch bar to move in a direction enabling closing of the valve.

During this operation, of course, the shifting lever 63 is moved by the fork 61 on the connecting bar 58 in a direction beyond the pivotal center of the shifting lever 69 as shown in Fig. 7, and the snap toggle action of the lever 63 and link 65 will put a spring pressure on the shift lever 69 so as to shift the clutch shaft upwardly when the clutch parts 34 and 35 are in proper alignment for again reversing the drive for the succeeding operation.

It should be pointed out here that the moment that one of the wheels of the predetermining counter which is not in control of the tripping mechanism at the time moves from zero position on its subsequent operation, it immediately shifts the lever 18 to raise its associated cam sleeve 21 and the cam carried thereby to a point where the cam is no longer in register with the roller 56 on its associated cam arm 57.

It is also desired to point out that each time one of the predetermining counters performs a complete tripping operation, the clutch shaft, through the medium of the crank arm 85, moves the slide 76 through one stroke of its cycle of operation, and through the medium of one of the pawls 78 or 79, depending upon which counter is operating, advances the packaging counter 75 one digit so that the packaging counter will indicate how many packages have been delivered. Also, during all of the operation of the meter the totalizing counter 86 will be in operation to indicate the total number of gallons delivered.

By means of my improved mechanism herein described it is obvious that it is only necessary to set one of the predetermining counters to indicate a package of a desired quantity and thereafter, by merely continuing to open the valve each time that package has been delivered and the valve automatically closes, the same quantity will be redelivered any number of times without any necessity of resetting either of the predetermining counters. The only time it is necessary to change the setting of the predetermining counters is when a package of a different quantity is desired.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In a mechanism of the character described, two registers, a common drive for driving said registers in opposite directions, a reciprocable latch bar and means for maintaining the latch bar in one position, means for operating said maintaining means to release said latch bar, said operating means including two constantly driven shafts, one of said shafts associated with each register, a tripping cam rotatable with each shaft and means controlled by said registers to render said tripping cams operative and means operated by either of said cams when so rendered operative to cause release of said maintaining means, there being other means present to reverse the direction of rotation of said common drive, such last named means being connected with the means operated by said cams to be actuated concurrently with the tripping movement of said tripping cam.

2. In a mechanism of the character described, two registers, a common drive for driving said registers in opposite directions, a reciprocable latch bar and means for maintaining the latch bar in one position, means for operating said maintaining means to release said latch bar, said operating means including two constantly driven shafts, one of said shafts associated with each register, a tripping cam rotatable with each shaft and means controlled by said registers to render said tripping cams operative and means operated by either of said cams when so rendered operative to cause release of said maintaining means, there being other means present to reverse the direction of rotation of said common drive, such last named means being connected with the means operated by said cams to be actuated concurrently with the tripping movement of said tripping cam, each of said tripping cams being mounted on an extensible sleeve on each of said constantly driven shafts, said means operated by said cams being in the path of said cams upon extension of said sleeve.

3. In a mechanism of the character described, two registers, a common drive for driving said registers in opposite directions, a reciprocable latch bar and means for maintaining the latch bar in one position, means operating said maintaining means to release said latch bar, said operating means including two constantly driven shafts, one of said shafts associated with each register, a tripping cam rotatable with each shaft and means controlled by said registers to render said tripping cams operative and means operated by either of said cams when so rendered operative to cause release of said maintaining means, there being other means present to reverse the direction of rotation of said common drive, said last named means being connected with the means operated by said cams to be actuated concurrently with the tripping movement of said tripping cam, each of said tripping cams being mounted on an extensible sleeve on each of said constantly driven shafts, said means operated by said cams being in the path of said cams upon extension of said sleeve, means normally holding said sleeve and associated cam out of contact with said means operated by said cams, said sleeve being extended by means connected with said register when said register reaches a preset number.

4. In a mechanism of the character described, two registers, a common drive for driving said registers in opposite directions, a reciprocable latch bar and means for maintaining the latch bar in one position, means for operating said maintaining means to release said latch bar, said operating means including two constantly driven shafts, one of said shafts associated with each register, a tripping cam rotatable with each shaft and means controlled by said registers to render said tripping cams operative and means operated by either of said cams when so rendered operative to cause release of said maintaining means, there being other means present to reverse the direction of rotation of said common drive, said last named means being connected with the means operated by said cams to be actuated concurrently with the tripping movement of said tripping cam, said means for releasing said latch bar also including a pair of cam arms, a connecting bar joining said cam arms, a cam block on said connecting bar and latch dogs engaging said latch bar, the configuration of the latch bar and dogs being such that only one dog at a time may engage the bar to hold it, one of said tripping cams moving said cam arm, connecting bar, and cam block in one direction to release one of said latch dogs and said latch bar, the other tripping cam moving the connecting bar in an opposite direction to release said other latch dog.

5. In a mechanism of the character described, two registers, a common drive for driving said registers in opposite directions, a reciprocable latch bar and means for maintaining the latch bar in one position, means for operating said maintaining means to release said latch bar, said operating means including two constantly driven shafts, one of said shafts associated with each register, a tripping cam rotatable with each shaft and means controlled by said registers to render said tripping cams operative and means operated by either of said cams when so rendered operative to cause release of said maintaining means, there being other means present to reverse the direction of rotation of said common drive, said last named means being connected with the means operated by said cams to be actuated concurrently with the tripping movement of said tripping cam, said means for releasing said latch bar also including a pair of cam arms, a connecting bar joining said cam arms, a cam block on said connecting bar and latch dogs engaging said latch bar, the configuration of the latch bar and dogs being such that only one dog at a time may engage the bar to hold it, one of said tripping cams moving said cam arm, connecting bar, and cam block in one direction to release one of said latch dogs and said latch bar, the other tripping cam moving the connecting bar in an opposite direction to release said other latch dog, said connecting bar having means associated therewith to initiate reversal of said common drive upon the beginning of its movement in either direction.

WILLIAM F. BERCK.